(12) United States Patent
Minyard

(10) Patent No.: US 7,496,681 B2
(45) Date of Patent: *Feb. 24, 2009

(54) SYSTEM AND METHOD FOR EXTENDING VIRTUAL SYNCHRONY TO WIDE AREA NETWORKS

(75) Inventor: Trenton Corey Minyard, Garland, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1086 days.

This patent is subject to a terminal disclaimer.

(21) Appl. No.: 10/832,132

(22) Filed: Apr. 26, 2004

(65) Prior Publication Data

US 2005/0021850 A1 Jan. 27, 2005

Related U.S. Application Data

(63) Continuation of application No. 09/476,638, filed on Dec. 31, 1999, now Pat. No. 6,779,038.

(51) Int. Cl.
*G06F 15/173* (2006.01)
*G06F 15/16* (2006.01)
(52) U.S. Cl. .............. 709/238; 709/234; 709/248
(58) Field of Classification Search ........... 709/234, 709/238, 248
See application file for complete search history.

(56) References Cited

U.S. PATENT DOCUMENTS

| | | | |
|---|---|---|---|
| 5,737,526 A * | 4/1998 | Periasamy et al. | 709/241 |
| 6,052,363 A | 4/2000 | Koch | |
| 6,331,983 B1 * | 12/2001 | Haggerty et al. | 370/400 |
| 6,473,425 B1 * | 10/2002 | Bellaton et al. | 370/392 |
| 6,597,658 B1 * | 7/2003 | Simmons | 370/221 |
| 6,674,767 B1 * | 1/2004 | Kadyk et al. | 370/466 |

OTHER PUBLICATIONS

Guo, Katherine et al,"Structured Virtual Synchrony: Exploring the Bounds of Virtual Synchronous Group Communication", Sep. 1996, ACM, Proceedings of the 7th ACM SIGOPS European Workshop, pp. 1-5.*

Koch, U.S. Appl. No. 08/940,412 entitled "Method for Causal Ordering in a Distributed Network" filed Sep. 30, 1997, now US Pat. No. 6,052,363.

Sape Mullender, *Distributed Systems*, 2nd, ACM Press, NY, NY (1993), pp. 255, 329-352-413-417.

(Continued)

*Primary Examiner*—Larry D Donaghue
*Assistant Examiner*—Brian J Gillis
(74) *Attorney, Agent, or Firm*—Carr LLP

(57) ABSTRACT

A virtual synchrony wide area network (100) which has at least a first local area network (LAN) (110) and a second LAN (120). A first router (114) and a second router (116) are connected to the first LAN (110), and a third router (142) and a fourth router (146) are connected to the second LAN (120). A point-to-point link (152) is connected between the first and third routers, (154) between the first and fourth routers, (156) between the second and third routers, and (158) between the second and fourth routers. Each router is provided with computer program code (206) for controlling the flow of messages through the routers and to maintain local total order with minimal latency.

8 Claims, 3 Drawing Sheets

OTHER PUBLICATIONS

David Powell, "Group Communications," *Communications of the ACM*, NY, NY, vol. 39, No. 4 (Apr. 1996), pp. 50-53.

L. E. Moser, Milliar-Smith, Agarwal, Budhia and Lingley-Papadopoulous, "Totem: A Fault-Tolerant Multicast Group Communication System," *Communications of the ACM*, pp. 54-63, vol. 39, No. 4 (Apr. 1996), pp. 54-63.

Deborah A. Agarwal, "Totem: A Reliable Ordered Delivery Protocol for Interconnected Local-Area Networks" (dissertation submitted in partial satisfaction of the requirements of the Degree of Doctor of Philosophy in Electrical and Computer Engineering), University of California, Santa Barbara (Aug. 1994).

\* cited by examiner

SYSTEM AND METHOD FOR EXTENDING VIRTUAL SYNCHRONY TO WIDE AREA NETWORKS

CROSS-REFERENCE TO RELATED APPLICATIONS

This application is a continuation of U.S. patent application Ser. No. 09/476,638 filed Dec. 31, 1999 now U.S. Pat. No. 6,779,038, entitled "System and Method for Extending Virtual Synchrony to Wide Area Networks".

TECHNICAL FIELD

The invention relates generally to communication networks and, more particularly, to a system and method for extending virtual synchrony to wide area networks.

BACKGROUND

A distributed system utilizing a protocol referred to as virtual synchrony (i.e., operating in a virtual synchrony environment) comprises a plurality of process groups, each of which process groups comprises a plurality of processes. Processes are typically distributed among two or more computers so that if one computer fails, the entire process group does not fail. Processes and process groups are configured for managing and executing application programs, and for transmitting messages between the process groups and processes.

Virtual synchrony ensures that a message transmitted to a plurality of destination processes is received by either all or none of the destination processes. Virtual synchrony, furthermore, ensures that messages delivered to a set of destination processes are delivered in a specified order to all destinations. In a system using virtual synchrony, the message order is maintained even though subsequent messages destined for other processes are interspersed with each other. Several message orders may be specified, generally FIFO (First-In-First-Out), causal, and total order.

FIFO order means that the messages will be delivered in the order they were transmitted but without any specified ordering between messages from different sources. So, if message source A transmits messages A1 and A2 in that order, and message source B transmits message B1 and B2 in that order, each destination may deliver A1, A2, B1, and B2 to applications on the respective destinations in any order, so long as A1 is delivered before A2 and B1 is delivered before B2, such as A1, A2, B1, B2; or B1, A1, B2, A2; etc.

Causal order means that a message may not be delivered before any cause of the message is delivered. For example, a process A may transmit a message A1 to both a process B and a process C. Message A1 causes process B to transmit message B1 to process C. If messages are delivered in causal order, then message A1 must be delivered before message B1 because B1 was caused by A1. These type of problems may happen in distributed systems due to transmission delays, loss of messages in the network causing retransmission, scheduling delays on processors, or many other network problems.

Total order means that each destination process may deliver all its messages in exactly the same order as any other process delivering the same set or any shared subset of messages. Suppose we have processes A, B, and C and message X1 comes to A and B, X2 comes to B and C, and X3 comes to all the processes. Any order may be selected as long as A and B deliver X1 and X3 in the same order and B and C deliver X2 and X3 in the same order.

Theoretically, these message orders can be applied in a mutually exclusive manner. In practice, though, they are generally inclusive (causal implies FIFO, total implies causal and FIFO).

Virtual synchrony with total order has been demonstrated to work very well within local area networks (LANs) using systems such as Totem. Such networks can be extended to wide area networks (WANs), using U.S. patent application Ser. No. 09/213,682, filed Dec. 17, 1998, entitled "Method and Apparatus to Extend the Fault-Tolerant Abilities of a Node into a Network," issued Apr. 9, 2002 in the name of Law, Jr., as U.S. Pat. No. 6,370,654, which is hereby incorporated in its entirety by reference herein. Local Totem networks can be made fault tolerant using redundant communication fabrics as discussed in greater detail in U.S. patent application Ser. No. 09/477,784, filed Dec. 31, 1999, and entitled "Redundant Communication Fabrics for Enhancing Fault Tolerance in Totem Networks", issued Apr. 22, 2003, in the name of Minyard, as U.S. Pat. No. 6,553,508, which is hereby incorporated in its entirety by reference herein. However, the system of U.S. Pat. No. 6,370,654 is not tolerant of the failure of a router or point-to-point communication link.

Accordingly, there is a need for a system and a method which will enable virtual synchrony to be extended to wide area networks while maintaining fault-tolerant properties.

SUMMARY

The present invention, accordingly, provides a system and a method which will enable virtual synchrony to be extended to wide area networks without a single point of failure in the system. In a preferred embodiment of the present invention, a virtual synchrony wide area network has a first local area network (LAN) and a second LAN. A first router and a second router are connected to the first LAN, and a third router and a fourth router are connected to the second LAN. Both LANs are virtual synchrony networks maintaining total order for all messages. A point-to-point link is connected between the first and third routers, between the first and fourth routers, and between the second and third routers, and between the second and fourth routers. Each router is provided with computer program code for controlling the flow of messages through the routers.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in block and schematic diagram form in order not to obscure the present invention in unnecessary detail. Additionally, for the most part, details concerning virtual synchrony and the like have been omitted inasmuch as such details are not necessary to obtain a complete understanding of the present invention and are within the skills of persons of ordinary skill in the relevant art.

Figure 1:
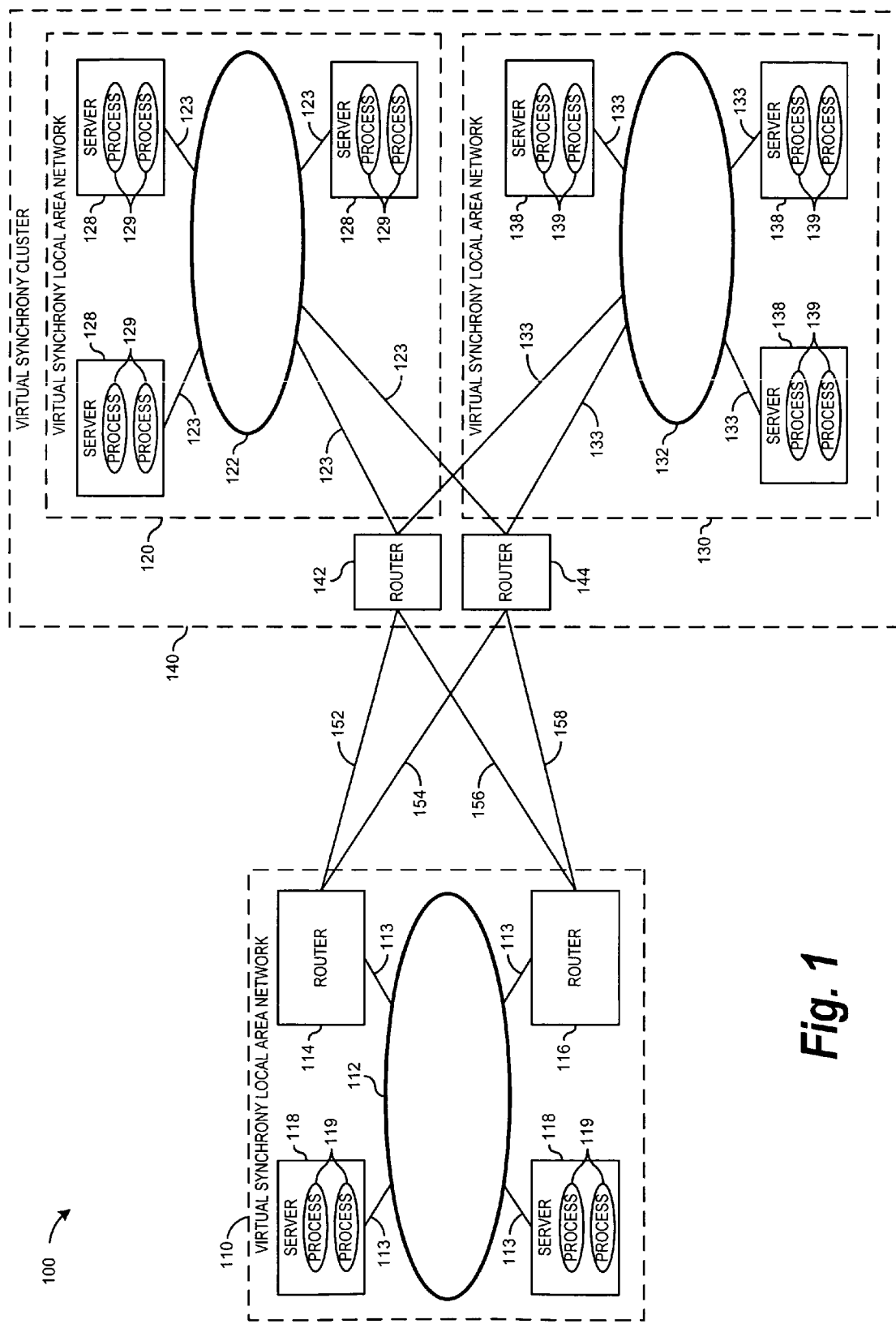
FIG. 1 is a representative high-level schematic diagram showing three virtual synchrony local area networks interconnected to form a virtual synchrony wide area network embodying features of the present invention.

Referring to FIG. 1 of the drawings, the reference numeral 100 generally designates a distributed virtual synchrony wide area network (WAN) embodying features of the present invention. The virtual synchrony WAN 100 may constitute a Totem network or the like, but is not limited to such. As shown in FIG. 1, the virtual synchrony WAN 100 includes a first virtual synchrony local area network (LAN) 110, a second virtual synchrony LAN 120, and a third virtual synchrony LAN 130, though the virtual synchrony WAN 100 may include a greater or lesser number of virtual synchrony LANs. As shown in FIG. 1, the second virtual synchrony LAN 120 and third virtual synchrony LAN 130 constitute a virtual synchrony cluster 140. The virtual synchrony LANs 110, 120, and 130 are interconnected for communication therebetween via a plurality of routers and point-to-point communication links, discussed below.

As described further below, each virtual synchrony LAN 110, 120, and 130 include at least one virtual synchrony communication fabric and at least one server and router connected to the fabric. Specifically, the virtual synchrony LAN 110 includes a virtual synchrony communication fabric 112 connected via links 113 to two routers 114 and 116 and two servers 118. The virtual synchrony LAN 120 includes a virtual synchrony communication fabric 122 connected via links 123 to two routers 142 and 144 and three servers 128. The virtual synchrony LAN 130 includes a virtual synchrony communication fabric 132 connected via links 133 to the two routers 142 and 144 and three servers 138. Each server 118, 128, and 138 comprise and are effective for executing at least one process 119, 129, and 139, respectively. The routers 114, 116, 142, and 144 may be conventional routers, and are preferably configured to have low latency failovers. Otherwise, the routers 114, 116, 142, and 144, as well as the links 113, 123, and 133, the servers 118, 128, and 138, and the processes 119, 129, and 139 and the execution of such processes by such servers are considered to be well-known in the art and will therefore not be discussed in further detail herein.

A plurality of point-to-point communication links interconnect the routers 114, 116, 142, and 144. Specifically, a point-to-point link 152 interconnects the routers 114 and 142; a point-to-point link 154 interconnects the routers 114 and 144; a point-to-point link 156 interconnects the routers 116 and 142; and a point-to-point link 158 interconnects the routers 116 and 144. Each router 114, 116, 142, and 144 is, additionally, effective for performing point-to-point routing communications via the point-to-point communication links 152, 154, 156, and 158. To that end, the links 152, 154, 156, and 158 preferably comprise reliable, sequenced point-to-point links, and preferably automatically disconnect, in a manner well-known in the art, when connectivity to a destination process fails. The links 152, 154, 156, and 158 may utilize transmission control protocol/internet protocol (TCP/IP), or a standard network interface such as the Ethernet or Asynchronous Transport Mode (ATM), or the like.

Figure 2:
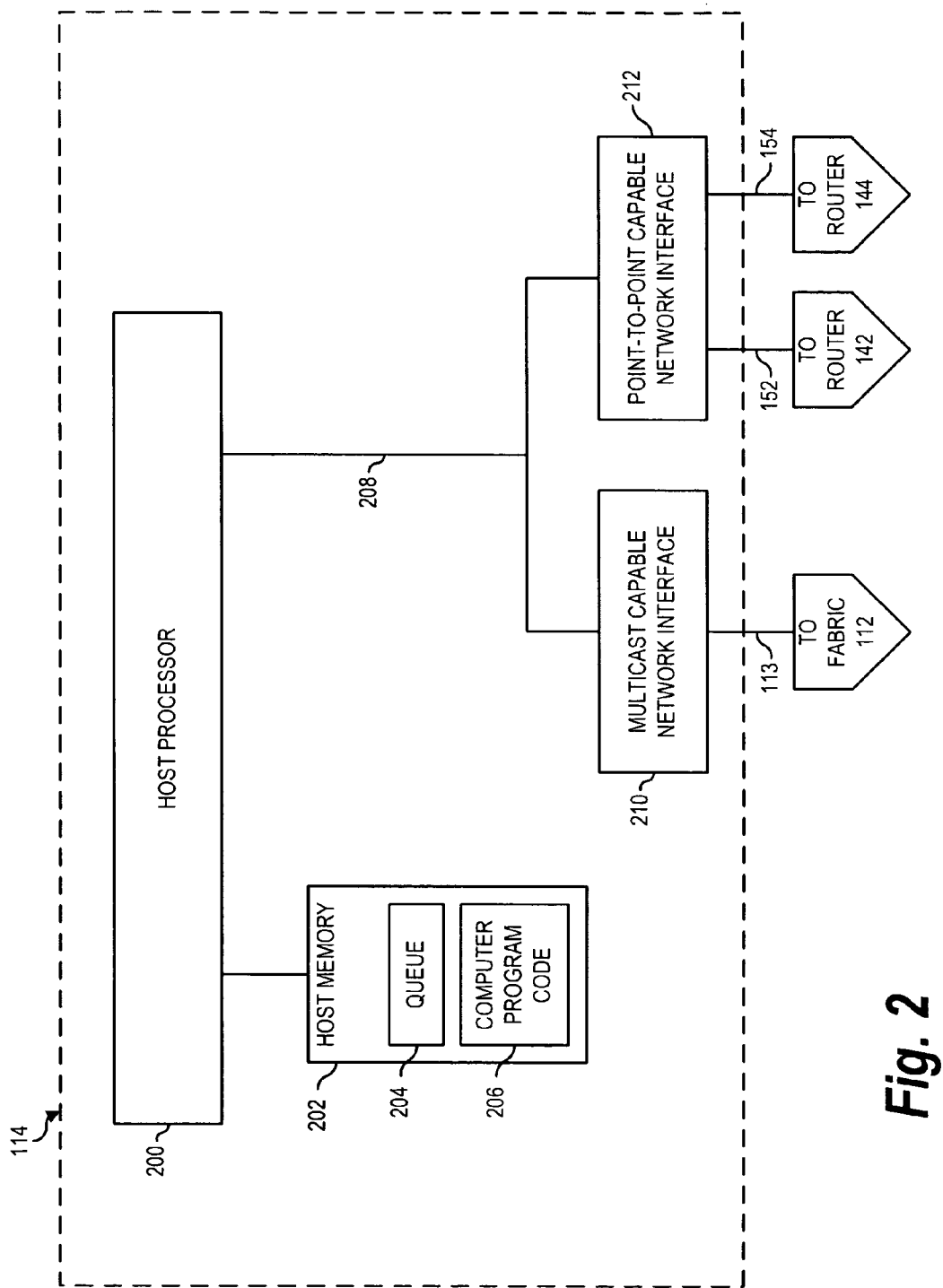
FIG. 2 is a conceptual block diagram of a router of FIG. 1.

The routers 114, 116, 142, and 144 are substantially identical to each other, in a functional sense, and, for the sake of conciseness, are depicted representatively in FIG. 2 by the router 114. As depicted therein and described further below, the router 114 comprises a host. processor 200, such as a conventional microprocessor or central processing unit (CPU). As described further below, the host processor 200 is connected in a conventional manner to a host memory 202, and is connected through a conventional computer bus interface 208, such as a personal computer interface (PCI) bus, or the like, to at least one multicast-capable network interface 210 and at least one point-to-point capable network interface 212.

The host memory 202 comprises conventional memory components, such as random access memory (RAM) and a hard disk memory (not shown). As discussed in further detail below, the host memory 202 is apportioned between, among other things, a queue 204 for storing the contents of messages to be routed, and computer program code 206.

The multicast-capable network interface device 210 comprises a 100BaseT interface device, or the like, effective for providing an interface between the host processor 200 of the router 114, and the LAN fabric 112 via the link 113 (FIG. 1). While not shown, additional multicast-capable network interfaces, similar to the interface 210, may be connected to the bus interface 208 to provide an interface to additional LAN fabrics, thereby enabling a single router to serve more than one virtual synchrony LAN, as exemplified in FIG. 1 with respect to the routers 142 and 144 and the LANs 122 and 132.

The point-to-point capable network interface 212 is connected for providing a point-to-point hardware interface between the host memory 202 and the links 152 and 154 (FIG. 1) to the communications networks 142 and 144 (FIG. 1), respectively. The point-to-point interface 212 may comprise any of a number of generic, off-the-shelf, industry-standard interfaces, such as 100BaseT, ATM 155, and the like, effective for providing point-to-point WAN interfaces.

Figure 3:
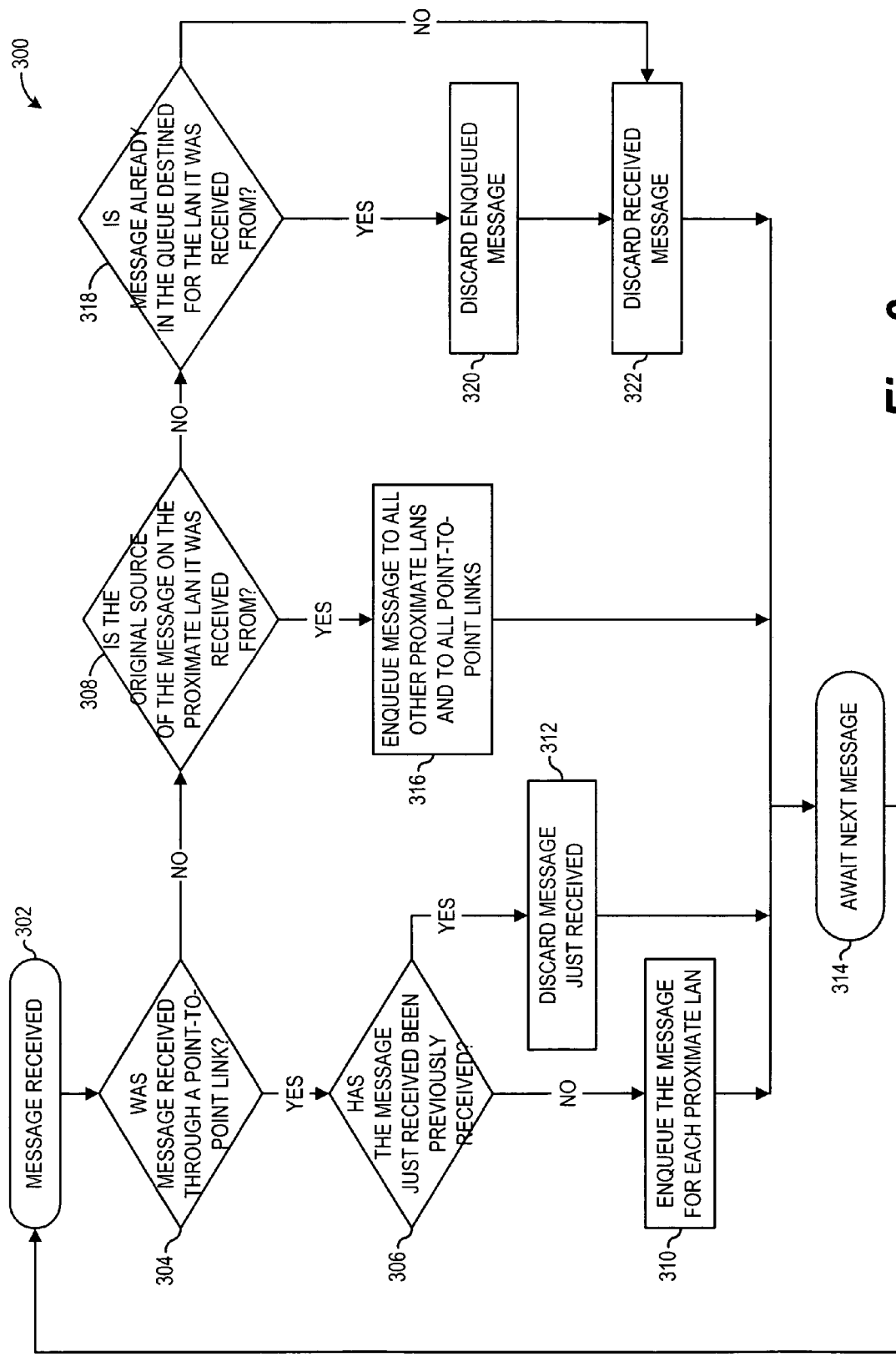
FIG. 3 is a high-level flow chart depicting the routing of messages through the router of FIG. 2.

FIG. 3 illustrates a flowchart 300 of control logic implemented by the computer program code 206 stored in each of the routers 114, 116, 142, and/or 144 for extending virtual synchrony in accordance with the present invention. For the purpose of illustration, the control logic will be representatively described with respect to the router 114. Furthermore, the term "proximate" applied to a LAN will be used herein with respect to a particular router to designate a LAN directly connected to such particular router via a multicast capable network interface 210 and link such as a link 113, 123, or 133.

With respect to the router 114, in step 302, a message is received into the router 114 from either a local LAN or via a point-to-point link. Such received message will be referred to herein as a "most recently received" message, to be distinguished from a number of messages which may have been received into the router 114 prior to the most recently received message, which prior messages are referred to herein as "previously received" messages.

Upon receipt of the most recently received message in step 302, execution proceeds to step 304, wherein a determination is made whether the most recently received message was received from one of the point-to-point links 152 or 154 connected to the router 114. If it is determined in step 304 that the most recently received message was received from a point-to-point link, then execution proceeds to step 306; otherwise, execution proceeds to step 308, discussed below.

In step 306, a determination is made whether the most recently received message is a duplicate message of a message previously received from any source, e.g., with respect to the router 114, from either a point-to-point link 152 or 154 or the link 113. Step 306 is performed by examining the contents of the queue 204 (FIG. 2) and comparing the contents of each previously received message stored in the queue 204 with the contents of the most recently received message. If a match is identified between the most recently received message and a previously received message, then execution proceeds to step 312, wherein the most recently received message is discarded. Otherwise, if a match is not identified between the most recently received message and a previously received message, then execution proceeds to step 310 wherein the most recently received message is stored in the queue 204 for subsequent delivery.

Upon completion of the steps 310 or 312, execution proceeds to step 314 wherein the router 114 awaits a next message. Upon inception of a next message, execution returns to step 302, discussed above.

If, in step 304 above, it was determined that the most recently received message was not received from a point-to-point link, then execution proceeds to step 308, wherein a determination is made whether the original source of the message is the proximate LAN the message was just received from. As discussed above, the proximate LAN, with respect to the routers 114 and 116, is the LAN 110, and, with respect to the routers 142 and 144, are the LANs 120 and 130. If it is determined that the original source of the message is the proximate LAN that the message was just received from, then execution proceeds to step 316 wherein the message is enqueued to all other proximate LANs and all point-to-point interfaces. Execution then proceeds to step 314 and 302 as discussed above.

If, in step 308, it is determined that the original source of the message is not the proximate LAN the message was just received from, then execution proceeds to step 318 wherein a determination is made whether the most recently received message is a duplicate of previously received message stored in the queue 204. Step 318 is performed by examining the contents of the queue 204 (FIG. 2) and comparing the contents of each previously received message stored in the queue 204 with the contents of the most recently received message. If a match is identified between the most recently received message and a previously received message, then execution proceeds to step 320 wherein the enqueued message is discarded. Upon completion of step 320, step 322 is executed wherein the most recently received message is discarded. If, in step 318, it is determined that the received message is not a duplicate of a message in the queue 204, then step 320 is bypassed and execution proceeds to directly to step 322 wherein the most recently received message is discarded. Upon completion of step 322, execution proceeds to step 314, discussed above.

Note that this methodology does not guarantee that all duplicate messages will be discarded in step 320. Multiple routers, 114 and 116 for example, may transmit the same message on the same proximate LAN, 112 for example, due to race conditions and other timing issues, resulting in the same message being sent twice on the LAN. Therefore, the servers in the system will need to detect and discard duplicate messages they receive.

The use of the present invention enables system-wide flow-control to reside in the routers 114, 116, 142, and 144, thereby allowing network overloads and focus events to be easily detected and handled. Thus, virtual synchrony may be extended to wide area networks without incurring latencies, while maintaining local total order of messages.

It is understood that the present invention can take many forms and embodiments. Accordingly, several variations may be made in the foregoing without departing from the spirit or the scope of the invention. For example, any number of routers may reside on a ring or set of rings. An interface, rather than point-to-point links, may be used to couple routers in a LAN environment.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A router configured for use in virtual synchrony wide area network, the router comprising:
   a) a host processor;
   b) a memory connected to the host processor;
   c) at least one first interface connected to the host processor and connectable to a first local area network (LAN); and
   d) at least one point-to-point capable network interface connected to the host processor and connectable through at least one first point-to-point link to a first router connected to a second LAN, and through at least one second point-to-point link to second router connected to the second LAN, wherein the first and second LANs comprise virtual synchrony networks, wherein the first and second LANs further comprise at least part of the virtual synchrony wide area network, wherein each router further comprises an ability to at least control the flow of messages through the router by at least means of sending messages, receiving messages, preventing duplicate messages, and when a message was not received through a point to point link, and when the original source of the message is a proximate LAN, then enqueuing the message to at least one other proximate LAN coupled to the router and enqueuing the message to at least one other point-to-point link coupled to the router.

2. The router of claim 1 further comprising a computer program product having a medium with a computer program embodied thereon, the computer program product comprising computer program code executable for controlling the flow of messages through the router.

3. The router of claim 1 further comprising a computer program product having a medium with a computer program embodied thereon, the computer program product comprising computer program code executable for controlling the flow of messages through the at least one point-to-point capable network interface, and for ensuring that a message transmitted through the at least one first point-to-point link or through the at least one second point-to-point link is also transmitted through the at least one second point-to-point link or through the at least one first point-to-point link, respectively.

4. The router of claim 1 wherein the at least one first interface comprises at least one multicast capable network interface.

5. A virtual synchrony wide area network, comprising:
   a) at least one first local area network (LAN), wherein at least one first LAN comprises a first virtual synchrony network;
   b) a first router connected to and configured for serving the at least one first LAN wherein the first router further comprises an ability to at least control the flow of messages through the first router by at least means of sending messages, receiving messages, preventing duplicate messages, and enqueuing messages;
   c) a second router connected to and configured for serving the at least one first LAN wherein the second router further comprises an ability to at least control the flow of messages through the second router by at least means of sending messages, receiving messages, preventing duplicate messages, and enqueuing messages;

d) at least one second LAN, wherein at least one second LAN comprises a second virtual synchrony network;

e) a third router connected to and configured for serving the at least one second LAN wherein the third router further comprises an ability to at least control the flow of messages through the third router by at least means of sending messages, receiving messages, preventing duplicate messages, and enqueuing messages;

f) a fourth router connected to and configured for serving the at least one second LAN wherein the fourth router further comprises an ability to at least control the flow of messages through the fourth router by at least means of sending messages, receiving messages, preventing duplicate messages, and enqueuing messages;

g) at least one first point-to-point link connected between the first router and the third router for establishing a channel of communication between the at least one first LAN and the at least one second LAN;

h) at least one second point-to-point link connected between the first router and the fourth router for establishing a channel of communication between the at least one first LAN and the at least one second LAN;

i) at least one third point-to-point link connected between the second router and the third router for establishing a channel of communication between the at least one first LAN and the at least one second LAN;

j) at least one fourth point-to-point link connected between the second router and the fourth router for establishing a channel of communication between the at least one first LAN and the at least one second LAN; and k) wherein the first and second connected virtual synchrony networks further comprise at least part of the virtual synchrony wide area network wherein for each router if a message was not received through a point to point link, and when the original source of the message is a proximate LAN, then enqueuing the message to at least one other proximate LAN coupled to the each router and enqueuing the message to at least one other point-to-point link coupled to the each router.

6. The virtual synchrony wide area network of claim 5 wherein the first router and the second router each comprise, respectively:
   a) a host processor;
   b) at least one multicast capable network interface interconnected between the host processor and a respective LAN;
   c) at least two point-to-point capable network interfaces interconnected between the host processor and one of the first, second, third, or fourth point-to-point links; and
   d) a host memory connected to the host processor.

7. The virtual synchrony wide area network of claim 5 wherein the first router and the second router each comprise, respectively:
   a) a host processor;
   b) at least one multicast capable network interface interconnected between the host processor and a respective LAN;
   c) at least two point-to-point capable network interfaces interconnected between the host processor and one of the first, second, third or fourth point-to-point links; and
   d) a host memory connected to the host processor, the host memory being apportioned between at least a queue, a register, and computer program code.

8. The virtual synchrony wide area network of claim 5 wherein the first router and the second router each comprise, respectively:
   a) a host processor;
   b) at least one multicast capable network interface interconnected between the host processor and a respective LAN;
   c) at least two point-to-point capable network interfaces interconnected between the host processor and one of the first, second, third, or fourth point-to-point links; and
   d) a host memory connected to the host processor, the host memory being apportioned between at least a queue, a register, and computer program code for controlling the flow of messages through the each router.

* * * * *